United States Patent
Adachi et al.

(10) Patent No.: US 7,216,107 B2
(45) Date of Patent: May 8, 2007

(54) MOBILE TERMINAL CONTROL METHOD AND MOBILE TERMINAL

(75) Inventors: Hidetaka Adachi, Minato-ku (JP); Takeshi Sakuma, Minato-ku (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 430 days.

(21) Appl. No.: 10/305,086

(22) Filed: Nov. 27, 2002

(65) Prior Publication Data

US 2003/0104803 A1 Jun. 5, 2003

(30) Foreign Application Priority Data

Nov. 30, 2001 (JP) .............................. 2001-366625

(51) Int. Cl.
*G06F 17/60* (2006.01)
(52) U.S. Cl. ............................ 705/50; 713/150; 725/34
(58) Field of Classification Search ................ 709/218, 709/203, 237, 217, 245, 231; 707/200; 715/526, 715/150; 713/168, 150; 705/27, 50; 725/34; 400/279
See application file for complete search history.

(56) References Cited

U.S. PATENT DOCUMENTS

| | | | | |
|---|---|---|---|---|
| 6,012,086 A | * | 1/2000 | Lowell | 709/218 |
| 2002/0069138 A1 | * | 6/2002 | Horibe | 705/27 |
| 2002/0073102 A1 | * | 6/2002 | Okamoto et al. | 707/200 |
| 2002/0161996 A1 | * | 10/2002 | Koved et al. | 713/150 |
| 2002/0194296 A1 | * | 12/2002 | Dutta et al. | 709/217 |
| 2003/0023973 A1 | * | 1/2003 | Monson et al. | 725/34 |
| 2003/0105890 A1 | | 6/2003 | Sakuma | |

FOREIGN PATENT DOCUMENTS

| | | |
|---|---|---|
| JP | 2000-347696 | 12/2000 |
| JP | 2001-014441 | 1/2001 |
| WO | WO 9418776 A2 * | 8/1994 |

OTHER PUBLICATIONS

AT&T to push new consumer phones at chicago show. The report on AT&T, vol. 6, No. 24. Jun. 6, 1988.*
Japanese Office Action for Application No. 2001-366625, dated Apr. 12, 2005 (w/translation).

* cited by examiner

*Primary Examiner*—James P. Trammell
*Assistant Examiner*—Behrang Badii
(74) *Attorney, Agent, or Firm*—Banner & Witcoff, Ltd (57) ABSTRACT

A control section limits the number of times of reproduction of content that is reproduced on a display unit. Thereby, a decrease in value of downloaded content is prevented, and a predetermined condition is provided when the number of times of reproduction of the content is counted up. Thus, the creator of the content is protected against disadvantages, while the user can keep enjoying the reproduction of the content.

9 Claims, 7 Drawing Sheets

FIG. 10

MOBILE TERMINAL CONTROL METHOD AND MOBILE TERMINAL

CROSS-REFERENCE TO RELATED APPLICATIONS

This application is based upon and claims the benefit of priority from the prior Japanese Patent Application No. 2001-366625, filed Nov. 30, 2001, the entire contents of which are incorporated herein by reference.

BACKGROUND OF THE INVENTION

1. Field of the Invention

The present invention relates to a method of controlling a mobile terminal having a function of reproducing content downloaded from a center apparatus, etc. via a network, and also relates to a mobile terminal.

2. Description of the Related Art

Mobile terminals such as mobile phones, which have recently been developed, have a function of reproducing content downloaded from a center apparatus, etc. via a network.

According to this function, a user downloads his/her desired content from a center apparatus, etc., and reproduces the downloaded content, as desired, thus enjoying services relating to the content.

The content downloaded from the center apparatus, etc. includes various service information such as multi-media applications and game applications. Such service information comprises still images, moving pictures, voice data and character data.

Conventionally, once some content has been downloaded from the center apparatus, etc. into a mobile terminal such as a mobile phone, it can be freely reproduced on the terminal side. However, recently, there has been a demand by a content provider side to limit the number of times of reproduction of such content.

The reason is that if the downloaded content is freely reproducible on the terminal side, with or without charge, the value of the content will decrease and the creator of the content may suffer an unexpected disadvantage.

Under the circumstances, there is an attempt to insert information for limiting the number of times of permitted reproduction into such kind of content, thereby to limit the number of reproduction of the downloaded content.

However, the reproduction-side terminal is a mobile terminal such as a mobile phone, and while downloaded content is being reproduced, the reproduction may forcibly be finished due to an unexpected incoming call, battery shutoff, or activation of an alarm sound generation function. Hence, if the number of times of reproduction is uniformly limited, the user may not fully enjoy the services by the reproduction of downloaded content due to occurrence of an unexpected situation.

BRIEF SUMMARY OF THE INVENTION

The object of the present invention is to provide a mobile terminal control method and a mobile terminal, which can prevent such a disadvantageous situation that a user cannot fully enjoy services by reproduction of downloaded content due to the occurrence of an unexpected situation.

In order to achieve the object, there is provided a method of controlling a mobile terminal including a function of downloading and reproducing content, comprising: a detecting step of detecting an occurrence of a reproduction stopping operation of stopping the reproduction of the downloaded content, before the reproduction of the downloaded content has reached a final stage; a counting step of counting up the number of times of reproduction when the reproduction stopping operation is not detected in the detecting step, assuming that the content has been completely reproduced, while not counting up the number of times of reproduction when the reproduction stopping operation is detected in the detecting step, assuming that the content has not completely been reproduced; and a reproduction prohibition control step of prohibiting, when the counted number of times of reproduction, which has been obtained in the counting step, has reached a preset number, subsequent reproduction of the content.

In order to achieve the object, there is also provided a mobile terminal including a function of downloading and reproducing content, comprising: detecting means for detecting an occurrence of a reproduction stopping operation of stopping the reproduction of the downloaded content, before the reproduction of the downloaded content has reached a final stage; counting means for counting up the number of times of reproduction when the reproduction stopping operation is not detected in the detecting means, assuming that the content has been completely reproduced, while not counting up the number of times of reproduction when the reproduction stopping operation is detected in the detecting means, assuming that the content has not completely been reproduced; and reproduction prohibition control means for prohibiting, when the counted number of times of reproduction, which has been obtained in the counting means, has reached a preset number, subsequent reproduction of the content.

According to the mobile terminal control method and the mobile terminal having the above structure, when a content reproduction stopping operation has not been detected, the number of times of content reproduction is counted up by determining the content reproduction to be a completed content reproduction operation. On the other hand, when a content reproduction stopping operation has been detected, the number of times of content reproduction is not counted up by determining the content reproduction to be a failed content reproduction operation. If the number of times of reproduction has reached a predetermined value, subsequent reproduction is prohibited.

According to the present invention, even if content reproduction is stopped due to an unexpectable situation for the user, such as occurrence of an incoming call or an e-mail, this content reproduction is not counted up as a completed content reproduction operation. Therefore, the user is free from such a disadvantage that he/she cannot fully enjoy services by the reproduction of downloaded content. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of a mobile terminal control method and a mobile terminal according to the present invention will now be described with reference to the accompanying drawings.

Figure 1:
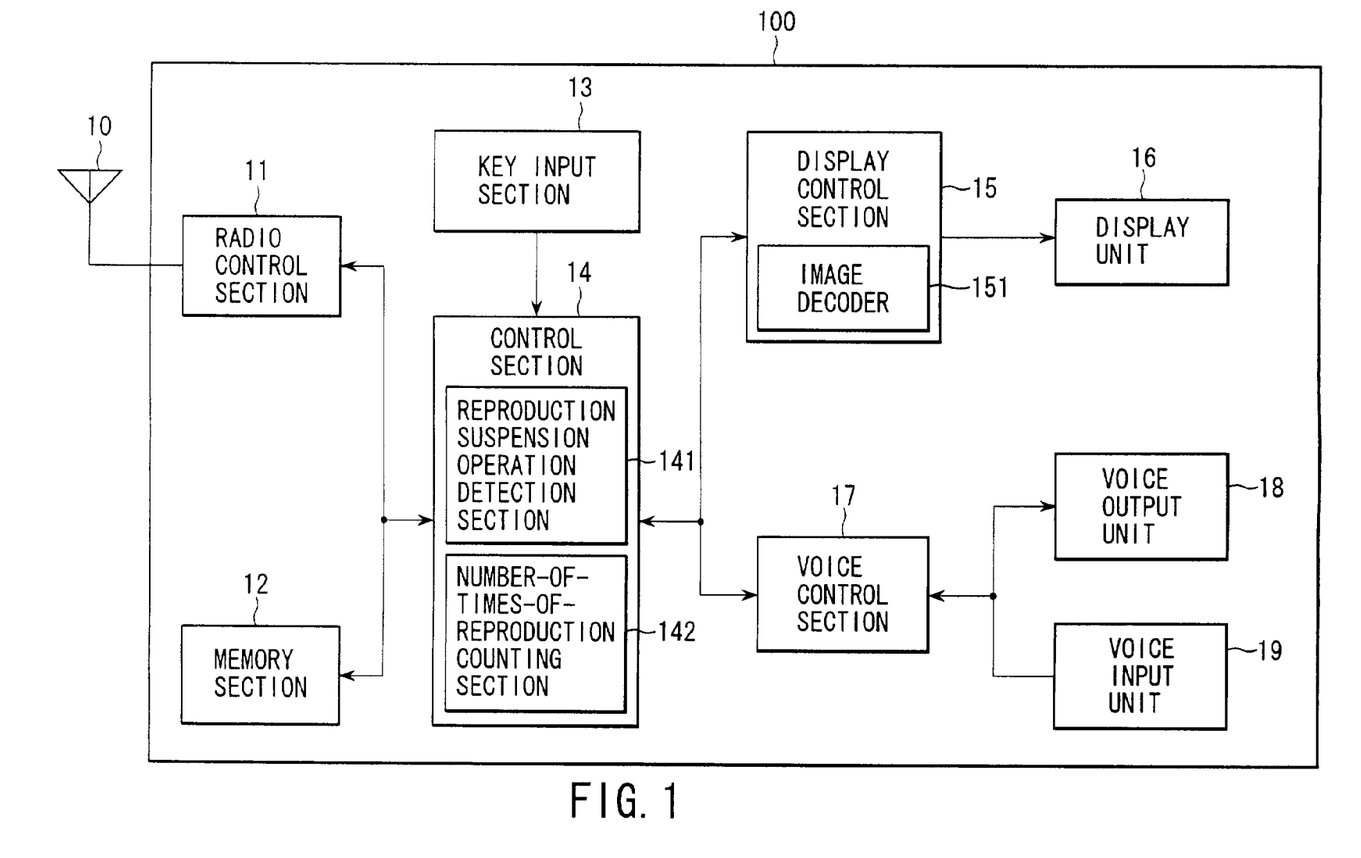
FIG. 1 is a block diagram showing an embodiment of a mobile terminal, such as a mobile phone, according to the present invention.

FIG. 1 is a block diagram showing an embodiment of a mobile terminal according to the present invention. In FIG. 1, a mobile phone 100 is shown as an example of the mobile terminal according to the present invention.

As is shown in FIG. 1, the mobile phone 100 comprises an antenna 10, a radio control section 11, a memory section 12, a key input section 13, a control section 14, a display control section 15, a display unit 16, a voice control section 17, a voice output unit 18 and a voice input unit 19.

The radio control section 11 processes radio signals to be transmitted/received via the antenna 10. For example, the radio control section 11 modulates and demodulates the radio signals. The memory section 12 temporarily stores various data to be processed in the mobile phone 100.

The data to be temporarily stored includes content relating to the invention, e.g. various service information such as multimedia applications and game applications including still images, moving pictures, voice data and character data downloaded from a center apparatus (not shown).

The key input section 13 includes a dial key and various function keys. For example, the key input section 13 includes a key for instructing a request for reproducing content downloaded from the center apparatus (not shown), and a power key or a stop (cancel) key which is operated during reproduction of content to forcibly finish the reproduction of content.

The control section 14 controls the operations of the respective parts of the mobile phone 100. The control section 14 includes a reproduction stopping operation detection section 141 that detects a reproduction stopping operation during the reproduction of content, and a number-of-times-of-reproduction counting section 142 that counts the number of times of reproduction of content. Based on the count value of the counting section 142, the control section 14 executes a reproduction prohibit control for prohibiting subsequent reproduction of content.

The display control section 15 includes an image decoder 151 that converts the content stored in the memory 12 to image data. Based on the image data produced by the image decoder 151, the display control section 15 executes a display control to cause the display unit 16 to display the content.

The display unit 16 displays content relating to the present invention, in accordance with the processing in the display control section 15. The display unit 16 also displays various data to be processed by the mobile phone 100.

The voice control section 17 processes a voice signal to be delivered to the voice output unit 18 and a voice signal input from the voice input unit 19.

The voice output unit 18 constitutes a transmitter of the mobile phone 100, and it comprises, e.g. a loudspeaker that outputs a voice signal as voice.

The voice input unit 19 constitutes a receiver of the mobile phone 100, and it comprises, e.g. a microphone that receives voice as a voice signal.

The reproduction of content in the mobile phone 100 will now be described in brief.

Content to be reproduced on the display control section 15 is downloaded from the center apparatus (not shown) via the antenna 10 and radio control section 11 through the operation of the key input section 13. The downloaded content is stored in the memory section 12.

The center apparatus may be a specific center apparatus, with which the user of the mobile phone 100 made a contract in advance, or a specific apparatus on the Internet if the mobile phone 100 is accessible to the Internet.

The content downloaded in the memory section 12 is reproduced on the display unit 16 according to the user's operation of the key input section 13.

In the mobile phone 100 of this embodiment, the number of times of content reproduction on the display unit 16 is limited to a predetermined number. Thereby, a decrease in value of the downloaded content is prevented, and the creator of the content is protected from suffering an unexpected disadvantage.

According to the present embodiment, information indicative of the limited number of times of content reproduction is included in the downloaded content, and the permissible number of times of content reproduction can be set, as desired, on a content-by-content basis. Alternatively, the number of times of content reproduction may be preset in the mobile phone 100 for associated services, for example, according to instructions from the center apparatus.

In the mobile telephone 100 of this embodiment, the number-of-times-of-reproduction counting section 142 does not simply add a count value according to the number of times of content reproduction. It adds the count value according to the following conditions.

1) The number of times of content reproduction is incremented by one, when the content reproduction is completed without a content reproduction stopping operation being detected by the reproduction stopping operation detection section 141 during the reproduction of the content.

2) Assume a case where the reproduction stopping operation detection section 141 has detected a content reproduction stopping operation during the reproduction of the content, and the content reproduction stopping operation is based on the user's intentional operation, for example, based on the depression of the power key or stopping key. In this case, if the reproduction of the last page of the content has been completed, the number of times of content reproduction is incremented by one. On the other hand, if the reproduction of the last page of the content has not been completed, the number of times of content reproduction is not incremented.

3) Assume a case where the reproduction stopping operation detection section 141 has detected a content reproduction stopping operation during the reproduction of the content, and the content reproduction stopping operation is not based on the user's intentional operation, for example, the content reproduction stopping operation is based on an operation based on an incoming call including an e-mail during the reproduction of the content, battery shutoff, or activation of an alarm sound generation function. In this case, the number of times of content reproduction is not incremented, irrespective of whether or not the reproduction of the last page of the content has been completed.

If the number of times of content reproduction, which has been counted by the number-of-times-of-reproduction counting section 142, has reached a predetermined value, the control section 14 prohibits subsequent reproduction of the content, for example, by forcible erasure of the content stored in the memory section 12.

Main controls associated with the call function of the mobile phone 100 are executed by the voice control section 17, voice output unit 18, and voice input unit 19. A description of details of the call function is omitted here, since it does not relate to the subject matter of the present invention.

Figure 2:
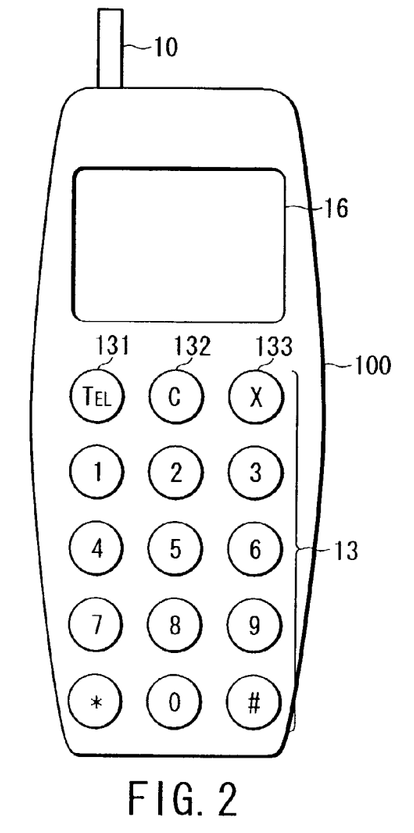
FIG. 2 shows an external appearance of the mobile phone shown in FIG. 1.

FIG. 2 shows an external appearance of the mobile phone 100 shown in FIG. 1.

In FIG. 2, the mobile phone 100 has the antenna 10 at a top portion thereof. A front side portion of the mobile phone 100 is provided with the display unit 16 and key input section 13 comprising a plurality of keys.

The display unit 16 displays reproduced content relating to the present invention.

The key input section 13 includes a plurality of dial keys and various function keys, and also includes a call key 131 with a mark "TEL" that is operated at the time of receiving an incoming call or sending an outgoing call, a stop key (cancel key) 132 with a mark "C" that is operated to cancel the reproduction of the content, and a power key 133 with a mark "X" that is operated at the time of switching on/off.

Figure 3:
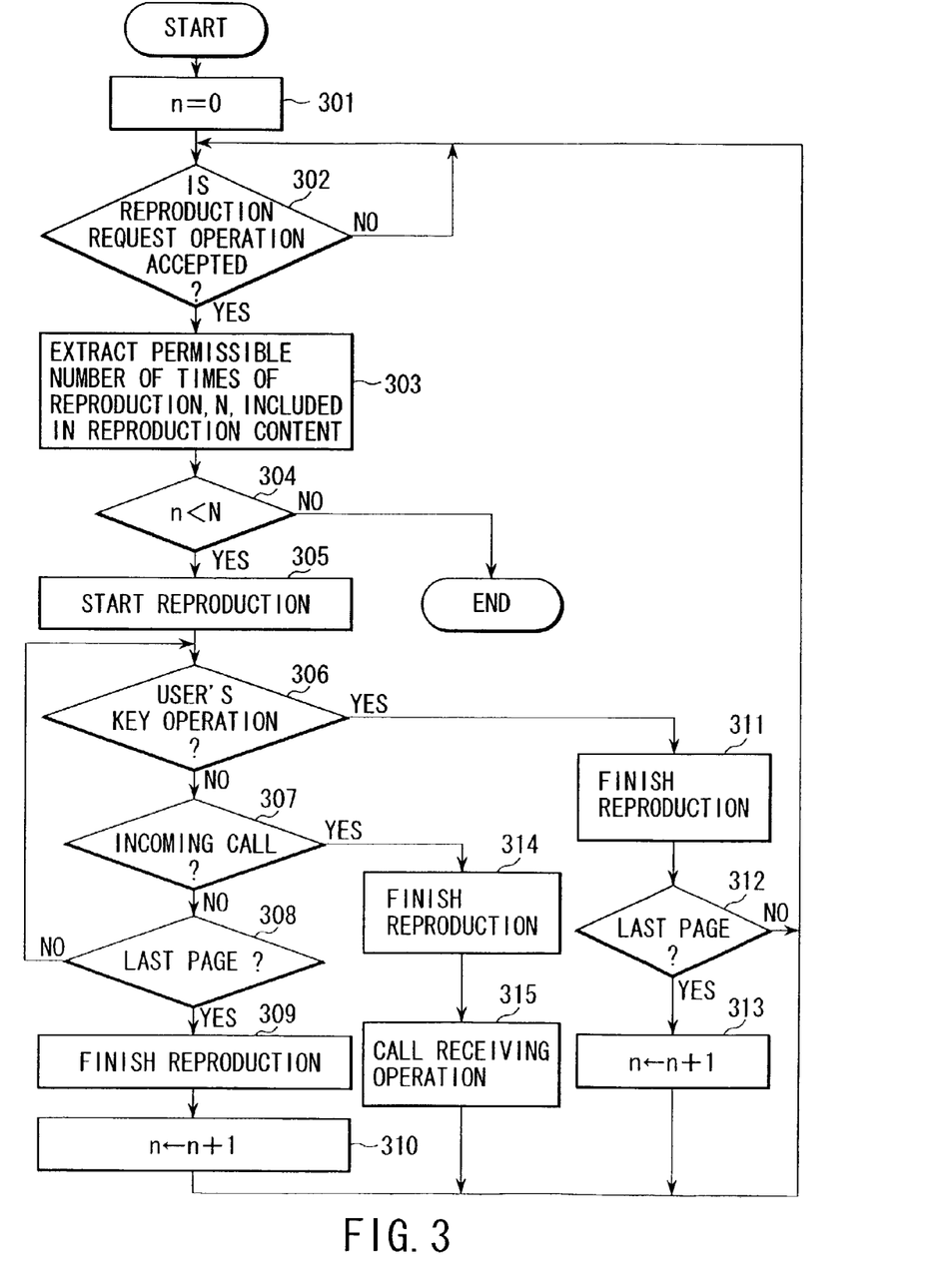
FIG. 3 is a flow chart illustrating an operation relating to content reproduction by the mobile phone shown in FIG. 1.

FIG. 3 is a flow chart illustrating an operation relating to content reproduction by the mobile phone shown in FIG. 1.

FIG. 3 illustrates a process of downloading a desired content from the center apparatus, etc. into the mobile phone 100 and reproducing the downloaded content. This process is executed by the control section 14.

If the process is started, the control section 14 sets the count value (the number of times of content reproduction) n of the number-of-times-of-reproduction counting section 142 to 0 (step 301). Then, the control section 14 determines whether a reproduction request operation for specific content has been accepted through the operation of the key input section 13 (step 302).

If the control section 14 has determined that no content reproduction request operation has been accepted (NO in step 302), control returns to step 302 to wait for acceptance of a content reproduction request operation. On the other hand, if the control section 14 has determined that a content reproduction request operation has been accepted (YES in step 302), the control section 14 extracts the permissible number of times of content reproduction, N, included in the reproduction content relating to the accepted content reproduction request operation (step 303).

The control section 14 determines whether the number of times of content reproduction, n, is less than the permissible number of times of content reproduction, N (step 304).

If the control section 14 has determined in step 304 that the number of times of content reproduction, n, is not less than the permissible number of times of content reproduction, N (NO in step 304), the present process is finished.

On the other hand, if the control section 14 has determined that the number of times of content reproduction, n, is less than the permissible number of times of content reproduction, N (YES in step 304), the content is read out of the memory section 12 and sent to the display control section 15.

In the display control section 15, the content is converted to image data by means of the image decoder 151 and sent to the display unit 16. Thus, the content reproduction is started (step 305).

After the content reproduction is started, the control section 14 determines whether the power key 133 or cancel key 132, which, if operated during the content reproduction, forcibly finishes the content reproduction, has been operated (step 306).

If the control section 14 has determined that neither the power key 132 nor cancel key 132 has been operated (NO in step 306), the control section 14 determines whether an incoming call has been received (step 307). The incoming call, in this context, includes an e-mail as well as an ordinary incoming call for call conversation.

In step 307, if the control section 14 has determined that no incoming call has been received (NO in step 307), it determines whether the content has been reproduced up to the last page (step 308). If the control section 14 has determined that the last page of the content has not yet been reproduced (NO in step 308), control returns to step 306 and the operations of steps 306, 307 and 308 are repeated.

If the control section 14 has determined that the content reproduction up to the last page has been completed without the power key 133 or cancel key 132 being operated, or without an incoming call being received (YES in step 308), the content reproduction process is finished (step 309) and the number of times of content reproduction is incremented by one (step 310). Control returns to step 302.

On the other hand, if the control section 14 has determined that the power key 133 or cancel key 132, which forcibly finishes the content reproduction, has been operated during the content reproduction (YES in step 306), it finishes the content reproduction process (step 311) and checks whether the reproduction content has been completed up to the last page (step 312).

If the control section 14 has determined that the content reproduction up to the last page has been completed (YES in step 312), the number of times of content reproduction, n, is incremented by one and the control returns to step 302. If the control section 14 has determined that the content reproduction up to the last page has not been completed (NO in step 312), the control returns to step 302 without incrementing the number of times of content reproduction, n, by one.

If the control section 14 has determined that an incoming call has been received during the content reproduction (YES in step 307), it finishes the content reproduction process (step 314) and executes a control to accept the incoming call (step 315). In this case, too, the control returns to step 302 without incrementing the number of times of content reproduction, n, by one.

In the above structure, when an incoming call has been received during the reproduction of the content and the content reproduction process has been forcibly finished, this failed reproduction is not counted as a single reproduction operation. The reason is that the reception of an incoming call is unexpectable by the user and it is unreasonable to count the forcibly finished content reproduction that resulted from an operation unexpectable by the user.

The present embodiment is configured such that when an incoming call has been received during the reproduction of the content and the content reproduction process has been forcibly finished, this failed reproduction is not counted as a single reproduction operation.

Alternatively, the control section 14 may be configured to detect forcible finish of content reproduction due to battery shutoff or the activation of an alarm sound generation function during the reproduction of the content and, in this case, does not count this content reproduction as a single reproduction operation.

In the above embodiment, if the power key 133 or cancel key 132, which forcibly finishes the content reproduction, has been operated during the content reproduction and if the reproduction content has not been completed up to the last page, this failed reproduction is not counted as a single reproduction operation.

In order to prevent a user dishonest operation, if the power key 133 or cancel key 132, which forcibly finishes the content reproduction, has been operated during the content reproduction, this content reproduction may be counted as a single reproduction operation irrespective of whether or not the reproduction content has been completed up to the last page.

Figure 4:
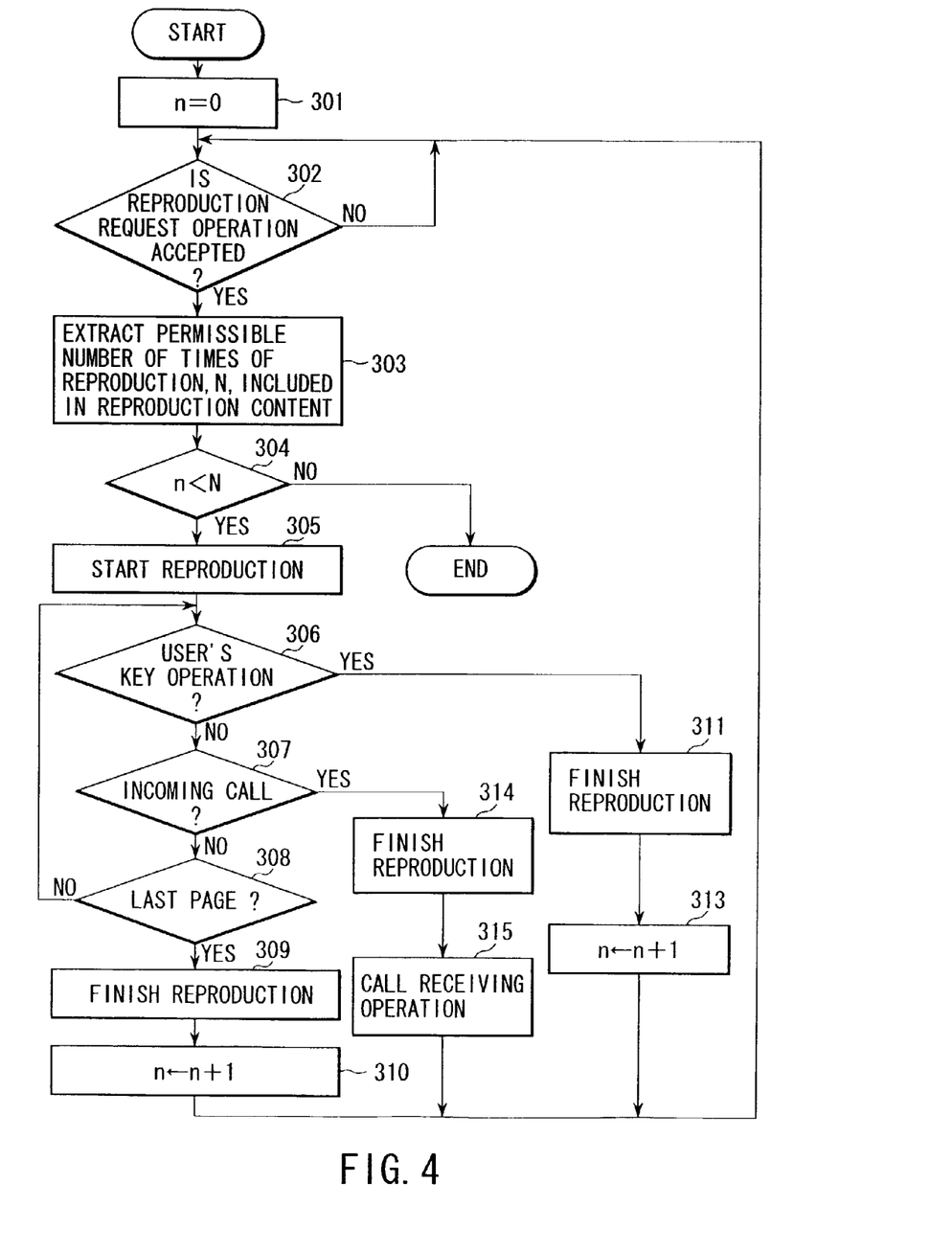
FIG. 4 is a flow chart illustrating an operation relating to content reproduction by the mobile phone shown in FIG. 1.

The process in this case is illustrated in FIG. 4. This process is executed by the control section 14. In the process illustrated in FIG. 4, the step 312 in FIG. 3 is omitted. In the other respects, the process of FIG. 4 is the same as that of FIG. 3.

In FIG. 4, if the control section 14 has determined that the power key 133 or cancel key 132, which forcibly finishes the content reproduction, has been operated during the content reproduction (YES in step 306), it finishes the content reproduction process (step 311) and increments the number of times of content reproduction, n, by one (step 313). The control thus returns to step 302.

This structure can completely avoid such an undesirable situation that the user intentionally depresses the power key 133 or cancel key 132 before the content reproduction is completed and finishes the content reproduction, thus permitting the user to reproduce the content substantially a countless number of times.

In addition, if the content reproduction is counted as a single reproduction operation irrespective of whether or not the reproduction content has been completed up to the last page, as in the process of FIG. 4, the content reproduction is counted as a single content reproduction even where the power key 133 or cancel key 132 is erroneously operated.

In order to avoid this problem, the following structure may be adopted. When it has been detected that the reproduction of content has progressed nearly to the last page of the content and the user has substantially enjoyed the reproduced content, this content reproduction is counted as a single content reproduction operation. On the other hand, if it is not detected that the reproduction of content has progressed nearly to the last page, this content reproduction is not counted as a single content reproduction operation.

Figure 5:
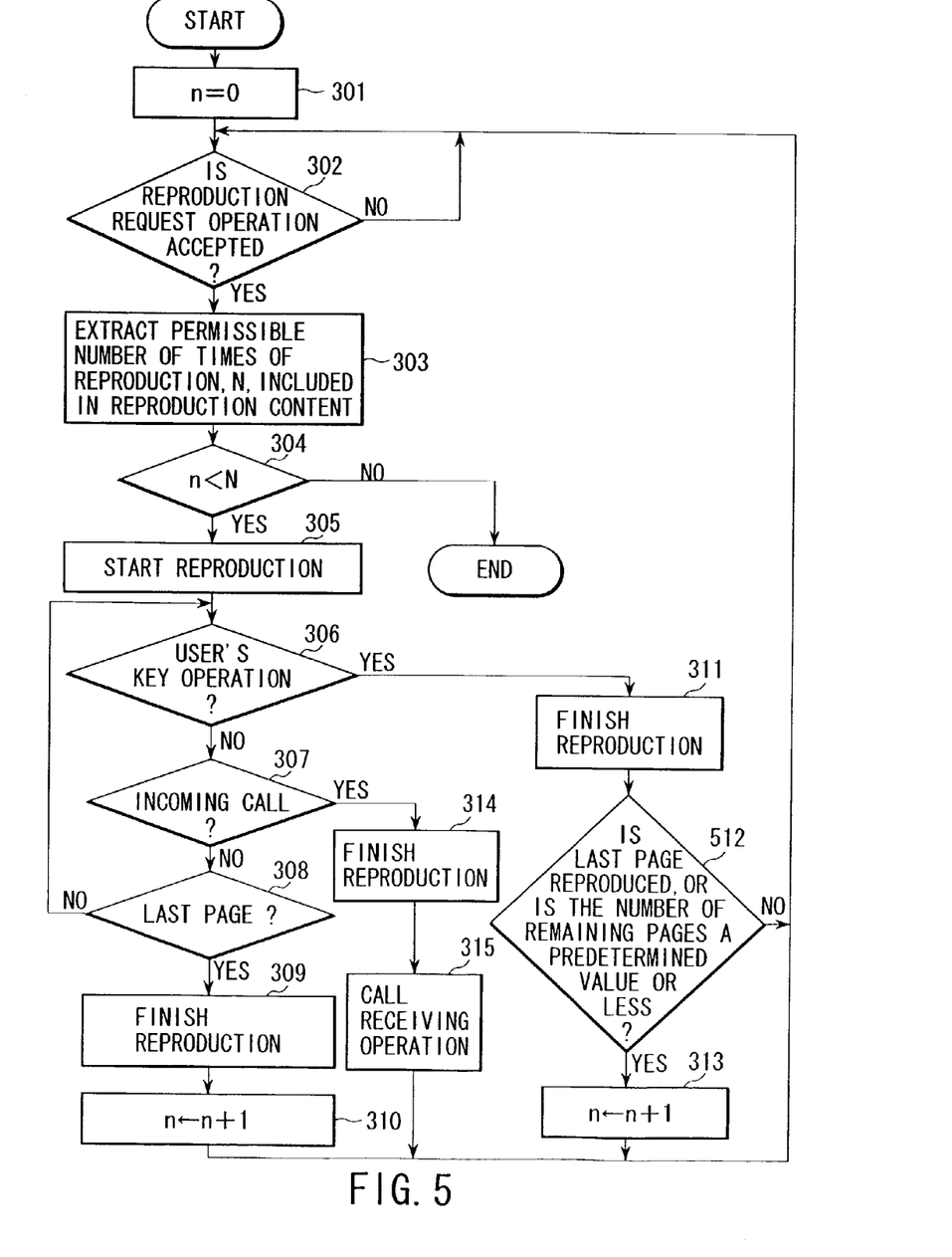
FIG. 5 is a flow chart illustrating an operation relating to content reproduction by the mobile phone shown in FIG. 1.

This process is illustrated in FIG. 5, and it is executed by the control section 14. In the process of FIG. 5, the step S312 in FIG. 3 is replaced with a step of determining whether the last page has been reproduced or the number of remaining pages to be reproduced is a predetermined value or less. In the other respects, the process of FIG. 5 is the same as that of FIG. 3.

In FIG. 5, if the control section 14 has determined that the power key 133 or cancel key 132, which forcibly finishes the content reproduction, has been operated during the content reproduction (YES in step 306), it finishes the content reproduction process (step 311).

Then, the control section 14 determines whether the last page has been reproduced or the number of remaining pages to be reproduced is a predetermined value or less (step 512). If the control section 14 has determined that the last page has been reproduced or that the number of remaining pages to be reproduced is a predetermined value or less (YES in step 512), it increments the number of times of content reproduction, n, by one (step 313), and the control returns to step 302.

On the other hand, if the number of remaining pages to be reproduced is greater than the predetermined value (NO in step 512), the control returns to step 302 without incrementing the number of times of content reproduction, n, by one.

As regards step 512, the determination of whether the last page has been reproduced or the number of remaining pages to be reproduced is a predetermined value or less can be made by determining whether the content reproduction has progressed up to a preset range of pages including the last page or determining whether the content reproduction has progressed up to a predetermined percentage or more of the whole content.

FIGS. 6 to 10 show examples of transition of images displayed on the display unit 16 in the content reproduction process illustrated in FIG. 3. Referring to these Figures showing transitions of images, the operation of the mobile phone 100 with the above structure will now be described.

Figure 6:
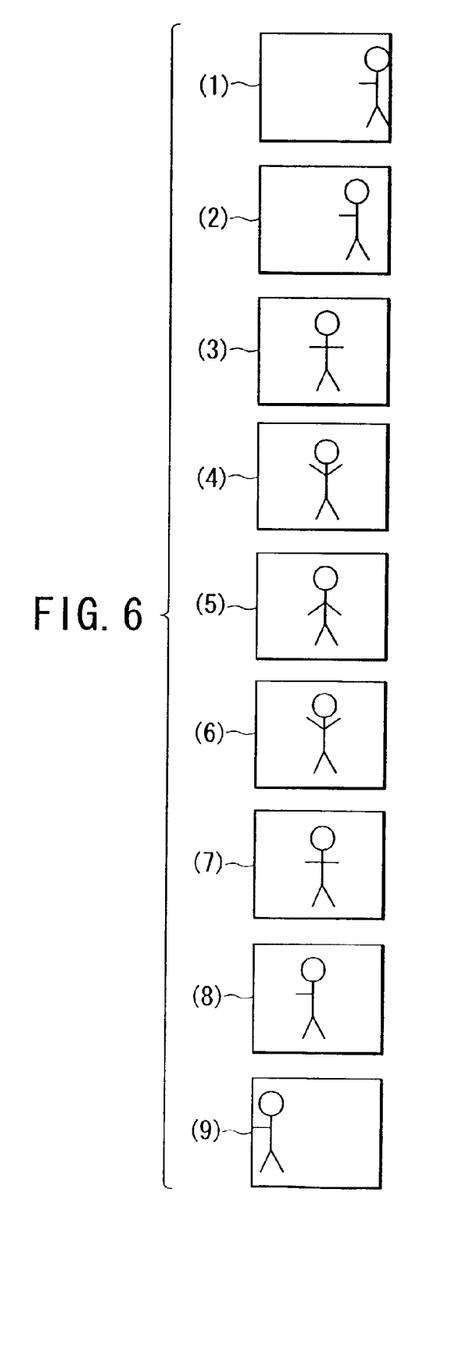
FIG. 6 shows an example of transition of images displayed on a display unit in a case where the mobile phone shown in FIG. 1 reproduces content.

FIG. 6 illustrates the transition of images of the whole content. The content shown in FIG. 6 is a moving picture reproduced by successively displaying images (1) to (9) in this order.

Figure 7:
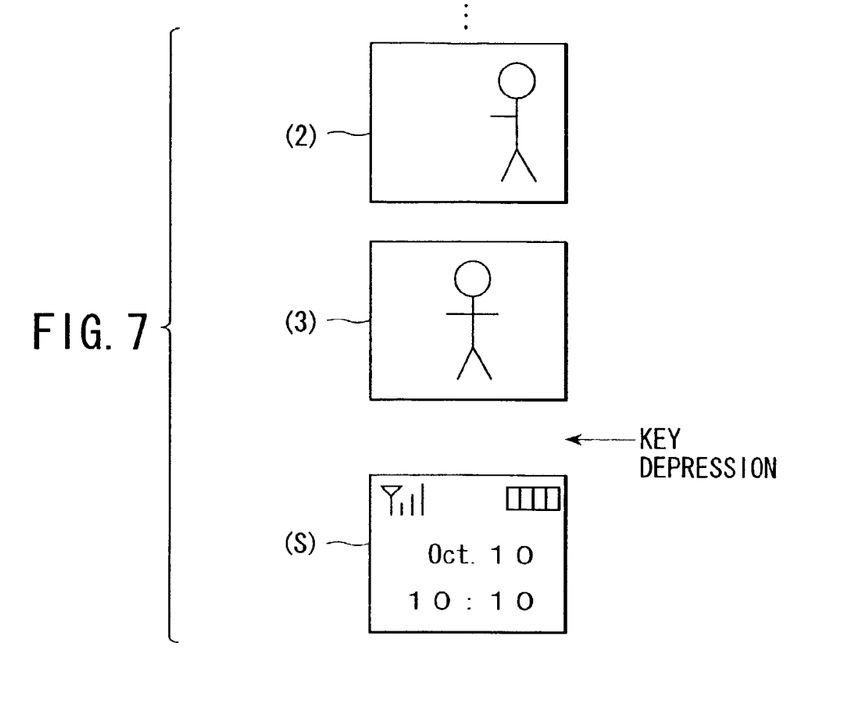
FIG. 7 shows an example of transition of images displayed on a display unit in a case where the mobile phone shown in FIG. 1 reproduces content.

Now assume, as shown in FIG. 7, that the power key 133 or cancel 132 that forcibly finishes the content reproduction has been depressed during the reproduction of the image (3). Then, the content reproduction operation is finished, and the display screen of display unit 16 changes to a standby screen (S). In this case, since the content reproduction has not progressed up to the last page, i.e. the last image (9), the control section 14 does not count this reproduction operation as a single content reproduction operation.

Figure 8:
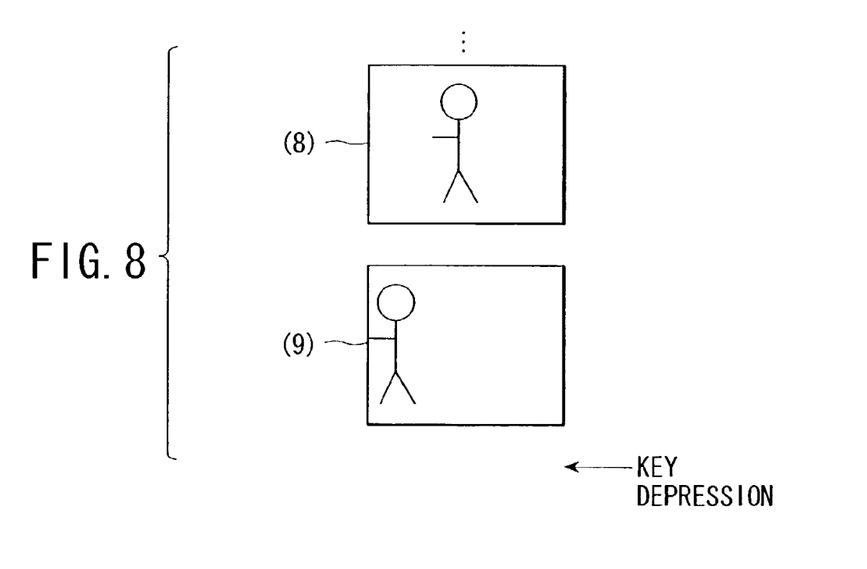
FIG. 8 shows an example of transition of images displayed on a display unit in a case where the mobile phone shown in FIG. 1 reproduces content.

In the example of FIG. 8, the power key 133 or cancel 132 that forcibly finishes the content reproduction has been depressed in the state in which the content reproduction has progressed to the last page, i.e. last image (9). In this case, since the content reproduction has progressed up to the last page, i.e. the last image (9), the control section 14 counts this reproduction operation as a single content reproduction operation, that is, a completed reproduction operation.

Figure 9:
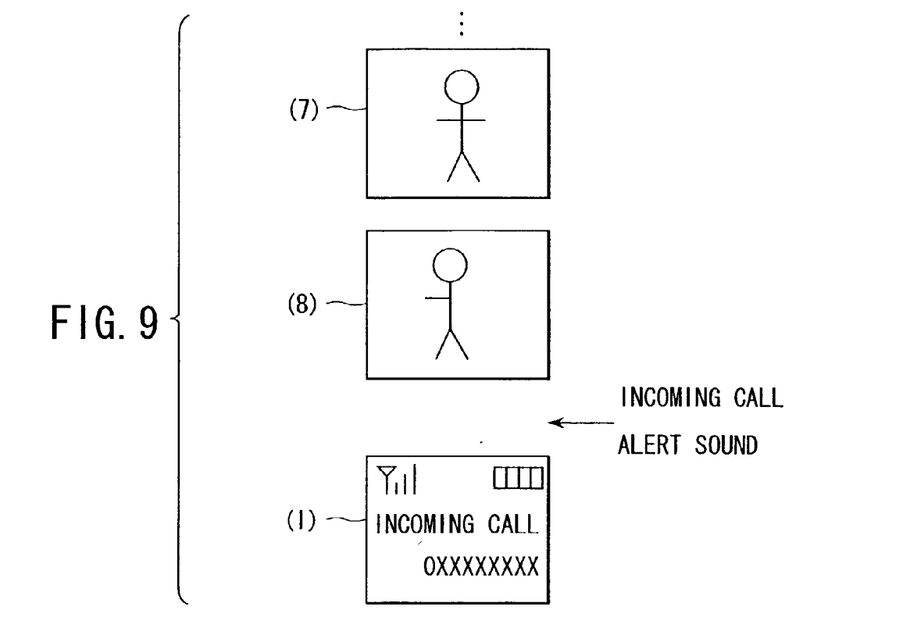
FIG. 9 shows an example of transition of images displayed on a display unit in a case where the mobile phone shown in FIG. 1 reproduces content.

In the example of FIG. 9, an incoming call has been received in the state in which the content reproduction has progressed to the image (8), and alerting sound has been produced. In this case, the content reproduction operation is finished and the display unit 16 displays a screen (I) indicative of the alert state. Since the content reproduction has been finished because of the incoming call, the control section 14 does not count this reproduction operation as a single content reproduction operation.

Figure 10:
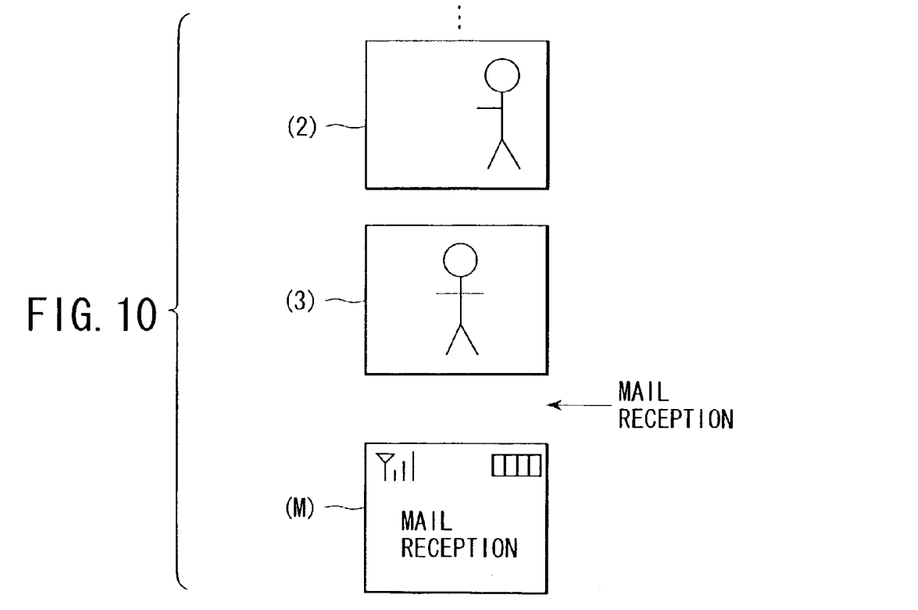
FIG. 10 shows an example of transition of images displayed on a display unit in a case where the mobile phone shown in FIG. 1 reproduces content.

In the example of FIG. 10, an e-mail has been received in the state in which the content reproduction has progressed up to the image (3), and the content reproduction operation has been finished. The display unit 16 displays a screen (M) indicative of the reception of the e-mail. In this case, too, since the content reproduction has been finished because of the reception of the e-mail, the control section 14 does not count this reproduction operation as a single content reproduction operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal having a function of downloading and playing a content, comprising:
   a storage unit configured to store a content and a numeric value relating to the content received from a center apparatus, via a radio antenna, based upon a download request, wherein the numeric value is used to limit playing the content;
   an input unit having a play key and a stop key;
   a display control unit configured to play the content stored in the storing unit if the play key is operated, and to stop playing the content if the stop key is operated;
   a counting unit configured to count as the number of play times if the display control unit stops playing the content based upon the stop key operation, and not to count as the number of play times if the display control unit stops playing the content based upon interruption of an incoming call; and
   a prohibition unit configured to prohibit playing the content if the number of play times, counted by the counting unit, corresponds to the numeric value stored in the storage unit.

2. The mobile terminal according to claim 1, wherein the display control unit displays an alerting message in place of the content if the incoming call is received while playing the content.

3. The mobile terminal according to claim 1, further comprising a decoder for decoding the content to be played before the display control unit plays the content.

4. A mobile terminal having a function of downloading and playing a content, comprising:
   a storage unit configured to store a content and a numeric value relating to the content received from a center apparatus, via a radio antenna, based upon a download request, wherein the numeric value indicates the permissible number of times the content is played;
   an input unit having a play key and a stop key;
   a display control unit configured to play the content stored in the storing unit if the play key is operated, and to stop playing the content if the stop key is operated;
   a counting unit configured to count as the number of play times if the display control unit stops playing the content based upon the stop key operation, and not to count as the number of play times if the display control unit stops playing the content based upon interruption of an incoming call; and
   a prohibition unit configured to prohibit playing the content if the number of play times, counted by the counting unit, corresponds to the numeric value stored in the storage unit.

5. The mobile terminal according to claim 4, wherein the display control unit displays an alerting message in place of the content if the incoming call is received while playing the content.

6. The mobile terminal according to claim 4, further comprising a decoder for decoding the content to be played before the display control unit plays the content.

7. A mobile terminal having a function of downloading and playing a content, comprising:
   a storage configured to store a content and a numeric value relating to the content received from a server apparatus, via a radio antenna, based upon a download request, wherein the numeric value indicates the permissible number of times the content is played;
   an input unit having a play key;
   a display control unit configured to play the content stored in the storage if the play key is operated;
   a counting unit configured to count as the number of play times if the content is played completely, and not to count as the number of play times if the display control unit stops playing the content based upon interruption of an incoming call; and
   a prohibition unit configured to prohibit playing the content if the number of play times, counted by the counting unit, corresponds to the numeric value stored in the storage unit.

8. The mobile terminal according to claim 7, wherein the display control unit displays an alerting message in place of the content if the incoming call is received while playing the content.

9. The mobile terminal according to claim 7, further comprising a decoder for decoding the content to be played before the display control unit reproduces the content.

* * * * *